(12) United States Patent
Nagel et al.

(10) Patent No.: US 9,620,274 B2
(45) Date of Patent: Apr. 11, 2017

(54) PROPORTIONAL LINEAR SOLENOID APPARATUS

(71) Applicant: Enfield Technologies, LLC, Shelton, CT (US)

(72) Inventors: Brett E Nagel, Hamden, CT (US); Jonathan B Gamble, Newtown, CT (US)

(73) Assignee: Enfield Technologies, LLC, Shelton, CT (US)

( * ) Notice: Subject to any disclaimer, the term of this patent is extended or adjusted under 35 U.S.C. 154(b) by 0 days.

(21) Appl. No.: 15/058,429

(22) Filed: Mar. 2, 2016

(65) Prior Publication Data

US 2016/0240295 A1    Aug. 18, 2016

Related U.S. Application Data

(63) Continuation of application No. 15/045,567, filed on Feb. 17, 2016.

(60) Provisional application No. 62/117,175, filed on Feb. 17, 2015.

(51) Int. Cl.
| | | |
|---|---|---|
| *H01F 3/00* | (2006.01) | |
| *H01F 7/16* | (2006.01) | |
| *F16K 31/06* | (2006.01) | |

(52) U.S. Cl.
CPC ........... *H01F 7/1638* (2013.01); *F16K 31/06* (2013.01)

(58) Field of Classification Search
CPC .... H01F 3/00; H01F 7/1607; H01F 2007/085; H01F 7/1623; H01F 7/081; H01F 2007/163

See application file for complete search history.

(56) References Cited

U.S. PATENT DOCUMENTS

| | | |
|---|---|---|
| 2,998,552 A | 8/1961 | Ray |
| 3,633,139 A | 1/1972 | Thompson |
| 3,921,670 A | 11/1975 | Clippard, Jr. et al. |
| 4,262,877 A | 4/1981 | Lang |
| 4,463,332 A | 7/1984 | Everett |
| 4,525,695 A | 6/1985 | Sheng et al. |

(Continued)

FOREIGN PATENT DOCUMENTS

| | | |
|---|---|---|
| DE | 4236047 A1 | 4/1994 |
| EP | 0284634 A1 | 10/1988 |

(Continued)

OTHER PUBLICATIONS

PCT International Search Report and Written Opinion mailed Jun. 2, 2016 for PCT/US16/18189, 8 pp.

*Primary Examiner* — Bernard Rojas
(74) *Attorney, Agent, or Firm* — Buckley, Maschoff & Talwalkar, LLC

(57) ABSTRACT

An apparatus may include a ferromagnetic housing defining a housing cavity, an electrically-conductive coil disposed in the housing cavity and defining a coil cavity, a ferromagnetic core piece disposed in the coil cavity, a ferromagnetic pole piece comprising a first face in contact with the core piece and a projection extending from a second face of the pole piece opposite the first face, a flexible element defining an opening, where the projection is disposed within the opening and the flexible element is disposed between a portion of the projection and the first face of the pole piece, and a ferromagnetic armature coupled to the flexible element, where the flexible element is disposed between at least a portion of the armature and the first face of the pole piece.

24 Claims, 11 Drawing Sheets

(56) References Cited

U.S. PATENT DOCUMENTS

| | | |
|---|---|---|
| 4,560,967 A | 12/1985 | Lindsey |
| 4,563,664 A | 1/1986 | Chin et al. |
| 4,635,683 A | 1/1987 | Nielsen |
| 4,682,135 A | 7/1987 | Yamakawa |
| 4,749,976 A | 6/1988 | Pichler |
| 4,763,091 A | 8/1988 | Lang |
| 4,767,097 A | 8/1988 | Everett et al. |
| 4,830,333 A | 5/1989 | Watson |
| 4,883,252 A | 11/1989 | Mesenich |
| 4,903,387 A | 2/1990 | Steer et al. |
| 4,906,880 A | 3/1990 | Miura |
| 4,954,799 A | 9/1990 | Kumar |
| 4,988,074 A | 1/1991 | Najmolhoda |
| 4,988,966 A | 1/1991 | Dumont et al. |
| 5,028,856 A | 7/1991 | Zannis |
| 5,067,687 A | 11/1991 | Patel et al. |
| 5,069,420 A | 12/1991 | Stobbs et al. |
| 5,108,071 A | 4/1992 | Hutchings |
| 5,138,291 A | 8/1992 | Day |
| 5,202,658 A | 4/1993 | Everett et al. |
| 5,265,594 A | 11/1993 | Olsson et al. |
| 5,301,921 A | 4/1994 | Kumar |
| 5,362,209 A | 11/1994 | Day |
| 5,392,995 A | 2/1995 | Wahba |
| 5,407,174 A | 4/1995 | Kumar |
| 5,549,274 A | 8/1996 | Buchanan et al. |
| 5,611,370 A | 3/1997 | Najmolhoda |
| 5,785,298 A | 7/1998 | Kumar |
| 5,921,526 A | 7/1999 | Najmolhoda |
| 5,975,488 A | 11/1999 | Imhof et al. |
| 5,996,628 A | 12/1999 | Najmolhoda et al. |
| 6,047,947 A | 4/2000 | Kumar |
| 6,062,531 A | 5/2000 | Rapp et al. |
| 6,079,435 A | 6/2000 | Franz et al. |
| 6,109,300 A | 8/2000 | Najmolhoda |
| 6,220,569 B1 | 4/2001 | Kelly |
| 6,224,033 B1 | 5/2001 | Kumar |
| 6,281,772 B1 | 8/2001 | Adams |
| 6,344,702 B1 | 2/2002 | Rodriguez et al. |
| 6,363,920 B1 | 4/2002 | Parker et al. |
| 6,390,129 B2 | 5/2002 | Jansen et al. |
| 6,404,314 B1 | 6/2002 | Arnold et al. |
| 6,604,726 B2 | 8/2003 | Kumar |
| 6,685,161 B2 | 2/2004 | Moser |
| 6,715,732 B2 | 4/2004 | Kumar |
| 6,720,853 B1 | 4/2004 | Callis et al. |
| 6,724,286 B2 | 4/2004 | Arnold et al. |
| 6,791,444 B2 | 9/2004 | Masuda et al. |
| 6,860,293 B2 | 3/2005 | Douglass et al. |
| 6,974,117 B2 | 12/2005 | Dzialakiewicz et al. |
| 7,028,978 B2 | 4/2006 | Kumar |
| 7,063,304 B2 | 6/2006 | Leys |
| 7,350,763 B2 | 4/2008 | Hofling |
| 7,458,529 B2 | 12/2008 | Ricco et al. |
| 7,651,806 B2 | 1/2010 | Chapman et al. |
| 8,430,378 B2 | 4/2013 | Hutchings et al. |
| 8,579,254 B2 | 11/2013 | Buse et al. |
| 2012/0097876 A1 | 4/2012 | Buse et al. |

FOREIGN PATENT DOCUMENTS

| | | |
|---|---|---|
| EP | 0357264 A2 | 3/1990 |
| EP | 0466985 A1 | 1/1992 |
| EP | 0568028 A1 | 11/1993 |
| EP | 0585838 A1 | 3/1994 |
| EP | 0736882 A1 | 10/1996 |
| EP | 1152314 A2 | 11/2001 |
| FR | 2732814 A1 | 10/1996 |
| WO | 97/39268 A1 | 10/1997 |
| WO | 2004/044468 A1 | 5/2004 |
| WO | 2005/022017 A1 | 3/2005 |
| WO | 2007/014827 A1 | 2/2007 |
| WO | 2008/066818 A1 | 6/2008 |
| WO | 2009104158 A2 | 8/2009 |
| WO | 2011/003661 A1 | 1/2011 |

PROPORTIONAL LINEAR SOLENOID APPARATUS

CROSS-REFERENCE TO RELATED APPLICATIONS

The application is a Continuation application of U.S. patent application Ser. No. 15/045,567, filed Feb. 17, 2016 and entitled "SOLENOID APPARATUS", which claims priority to U.S. Provisional Patent Application Ser. No. 62/117,175, filed Feb. 17, 2015 and entitled "Proportional 2-Way Valve", the contents of which are incorporated herein by reference for all purposes.

BACKGROUND

Generally, a solenoid converts energy to linear motion. This linear motion may serve many purposes, including but not limited to operation of a mechanical switch and selective control of one or more fluid paths. Solenoid-based systems exhibit varying degrees of efficiency (force per unit of supplied energy), linearity (i.e., of the efficiency curve), proportionality (i.e., of movement to suppled energy), and hysteresis effects (which result in different system response depending on whether the supplied energy is increasing or decreasing). Depending upon their intended use, a solenoid and the system in which it is employed are typically designed to maximize one or more of these characteristics. However, designers face challenges in maximizing one or more of these characteristics while keeping others within desired tolerances.

BRIEF DESCRIPTION OF THE DRAWINGS

The following description is provided to enable any person in the art to make and use the described embodiments. Various modifications, however, will remain readily apparent to those in the art.

DESCRIPTION

Figure 1:
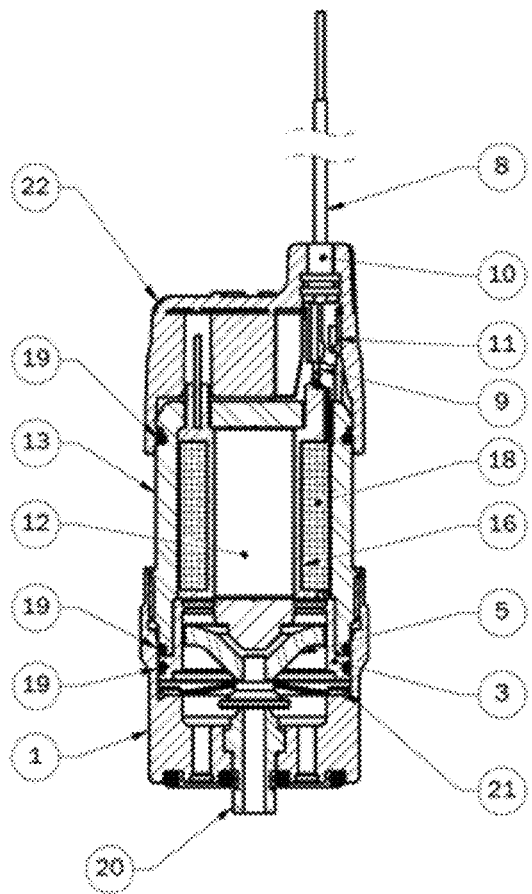
FIG. 1 is a cross-sectional view of an apparatus according to some embodiments.

An inventive two-way proportional solenoid apparatus is presented herein. Some embodiments implement a valve for metering a variety of working fluids including gases and liquids. The following description is provided to enable any person in the art to make and use the described embodiments. Various modifications, however, will remain readily apparent to those in the art.

FIGS. 1-5 include cross-sectional, perspective and exploded views of an apparatus according to some embodiments. The depicted apparatus is a solenoid valve, but embodiments are not limited thereto. Embodiments may differ from the depicted apparatus in shape, size, components, construction, and/or materials.

The housing (13) is ferromagnetic and is substantially cylindrical in construction. The housing (13) contains a coil assembly comprising a coil (18) wound around a bobbin (16). Pins (9) protrude through openings in the end of the housing (13). Pins (9) are supported by the bobbin (16) and electrically connected to the coil (18). In the illustrated embodiment, an electrical connector (11) plugs onto pins (9) to supply power to the coil (18) via lead-wires (8). Implementations may utilize other types of connections to the pins (9) and to the coil (18). The electrical connector (11) is retained by a molded plastic cap (22) which presses over an end of the housing (13) through which pins (9) protrude. A seal (19) restricts the ingress of moisture into the cap (22). The lead-wires (8) pass through two holes in the cap (22), which are sealed using cable seals (10).

A ferromagnetic core piece (12) is disposed within the bobbin (16), and abuts a ferromagnetic pole piece (3). The core piece (12) and the pole piece (3) may comprise different materials (e.g., different grades of steel) particularly-suited to their below-described functions. According to some embodiments, the core piece (12) and the pole piece (3) comprise a single integral piece. The ferromagnetic pole piece (3) mates with a portion of a moving armature sub-assembly (5). During operation, and as will be described below, features of the pole piece (3) facilitate the advantageous positioning of the moving armature sub-assembly (5) and also provide improved operational efficiency.

Figure 10:
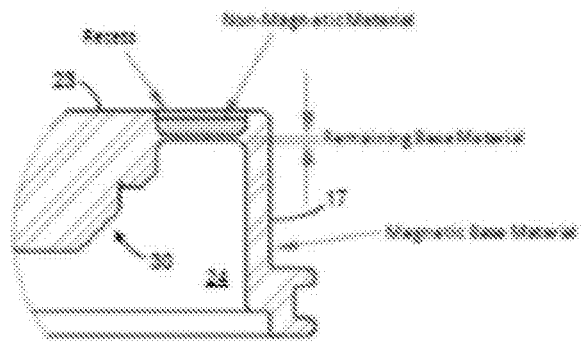
FIG. 10 is a cross-sectional view of a pole piece according to some embodiments.

FIGS. 6-9 include various views of the pole piece (3), while FIG. 10 provides a more detailed view of its construction. According to some embodiments, a back face of the pole piece (3) (i.e., the face exposed to the core piece (12))

includes a recess filled with a substantially non-magnetic material (15). A projection (30) extends from a face of the pole piece (3) opposite the back face.

The recess may be created on the back face prior to machining any of the internal features of the pole piece (3), and the recess is substantially filled by melting copper therewithin. The material (15) may be selected for its structural as well as magnetic characteristics, as it may also provide support to the structure of the pole piece (3). The internal features such as the projection (30) are subsequently created, leaving a thin portion of ferromagnetic base material at the base of the recess, as shown in FIG. 10.

According to some embodiments, these features may reduce and/or substantially prevent magnetic flux from passing between the outer cylindrical surface (17) of the pole piece (3) and the center pole face (23), increasing the amount of magnetic flux contributing to the axial force experienced by the moving armature sub-assembly (5). This phenomenon will be described in more detail below with respect to FIG. 18.

Moreover, a sealed chamber (24) is created for a working fluid without requiring additional components and seals. Additionally, since such a working fluid would not contact the non-magnetic material (15), problems with fluid compatibility and corrosion may be virtually eliminated.

The aforementioned construction sequence (i.e., create recess, fill recess with non-magnetic support material, machine internal features) facilitates conforming the internal features of the pole piece (3) to tight dimensional tolerances. In this regard, and as mentioned above, certain internal features of the pole piece (3) are used to locate and mate with the moving armature sub-assembly (5).

Figure 11:
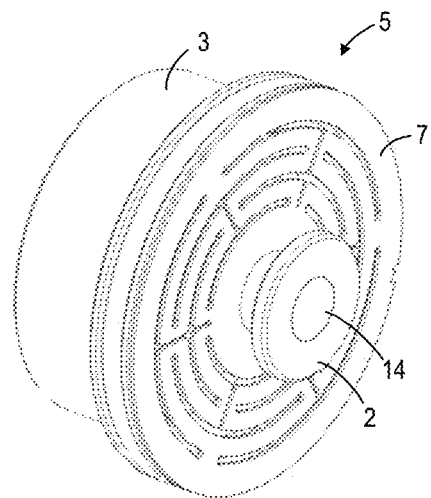
FIG. 11 is a bottom-side perspective view of a pole piece and a moving armature sub-assembly according to some embodiments.
Figure 12:
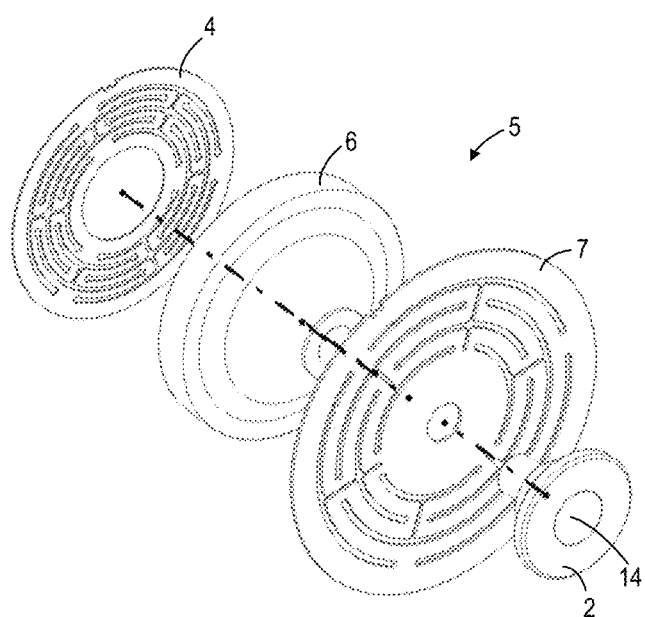
FIG. 12 is an exploded view of a moving armature sub-assembly according to some embodiments.

FIG. 11 is a perspective view of the moving armature sub-assembly (5) coupled to the pole piece (3) according to some embodiments. As shown in the exploded view of FIG. 12, the moving armature sub-assembly (5) comprises a ferromagnetic armature (6), a guide spring (4), a valve spring (7) and a poppet (2). The poppet (2) further incorporates an elastomeric insert (14) in the center of its exposed face as shown.

The two disk springs (4) and (7) exhibit substantially higher stiffness in the radial direction than in the axial direction. These properties strongly constrain the armature (6) to move primarily in the axial direction. According to some embodiments, the guide spring (4) is welded to the back face of the armature (6), and the valve spring (7) is retained by the poppet (2) which is inserted into the armature (6) and swaged in place.

Figure 13:
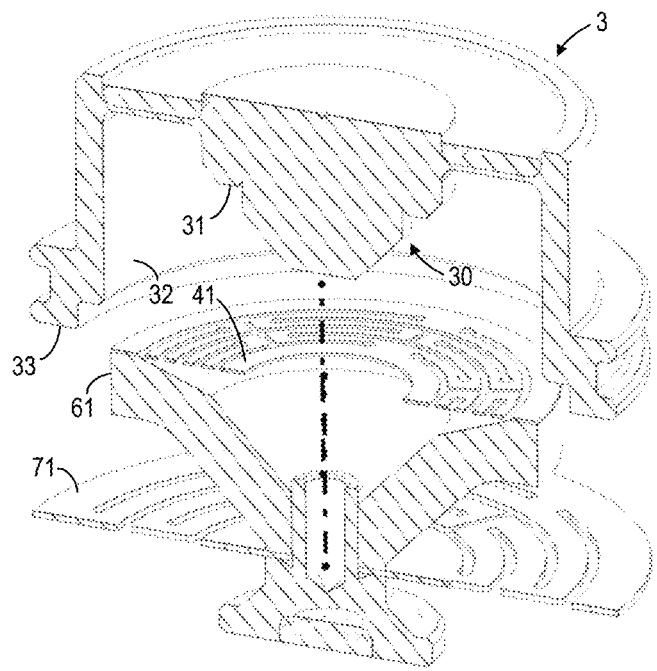
FIG. 13 is a top-side cross-sectional view of a pole piece and a moving armature sub-assembly according to some embodiments.
Figure 14:
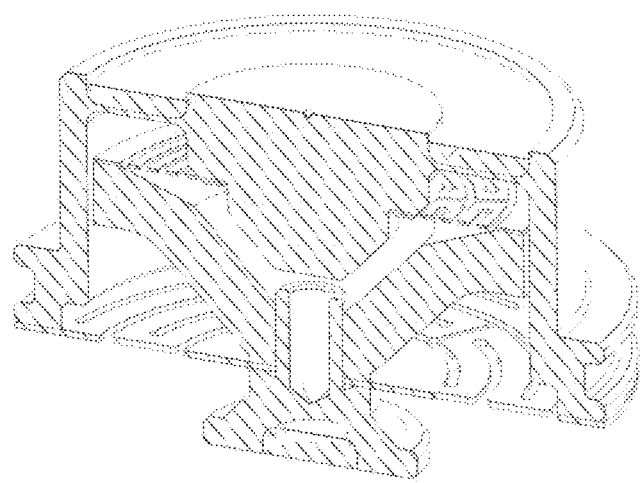
FIG. 14 is a top-side cross-sectional view of a pole piece and a moving armature sub-assembly according to some embodiments.

FIGS. 13 and 14 illustrate the coupling of the pole piece (3) and the armature sub-assembly (5) according to some embodiments. A portion of the projection (30) passes through an opening defined by the guide spring (4), features (31) of the projection (30) contact a center portion (41) of a first face of the guide spring (4), and an internal cylindrical surface (32) of the pole piece (3) is spaced a small distance from a widest outer cylindrical surface (61) of the armature (6). An outer portion of the second face of the guide spring (4) is in contact with the arnature (6) at its outer circumference. A face (71) of the valve spring (7) abuts a lower rim (33) of the pole piece (3). The operational significance of these physical features will be described below.

Figure 2:
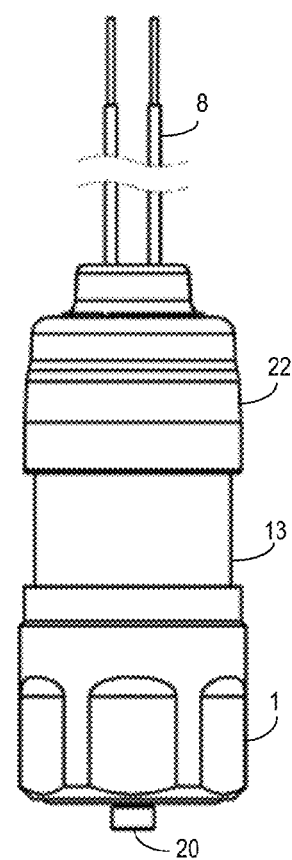
FIG. 2 is an elevational view of an apparatus according to some embodiments.
Figure 3:
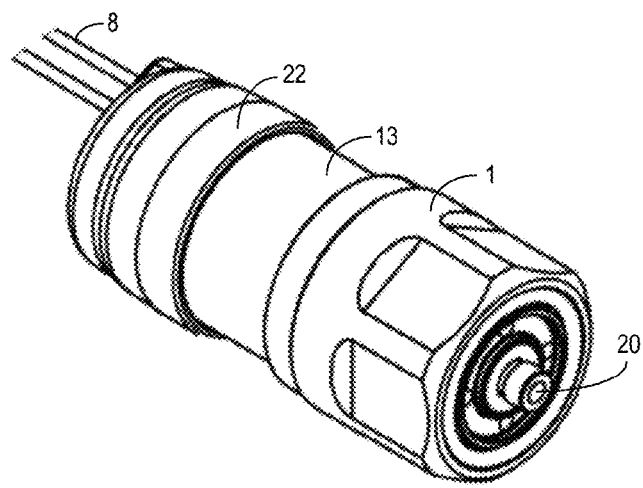
FIG. 3 is a bottom-side perspective view of an apparatus according to some embodiments.
Figure 4:
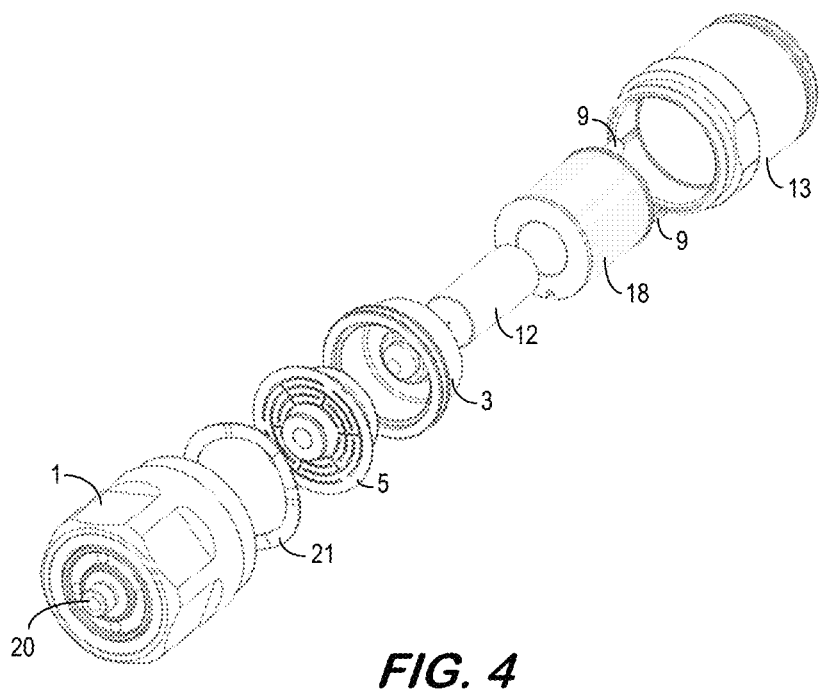
FIG. 4 is an exploded view of an apparatus according to some embodiments.
Figure 5:
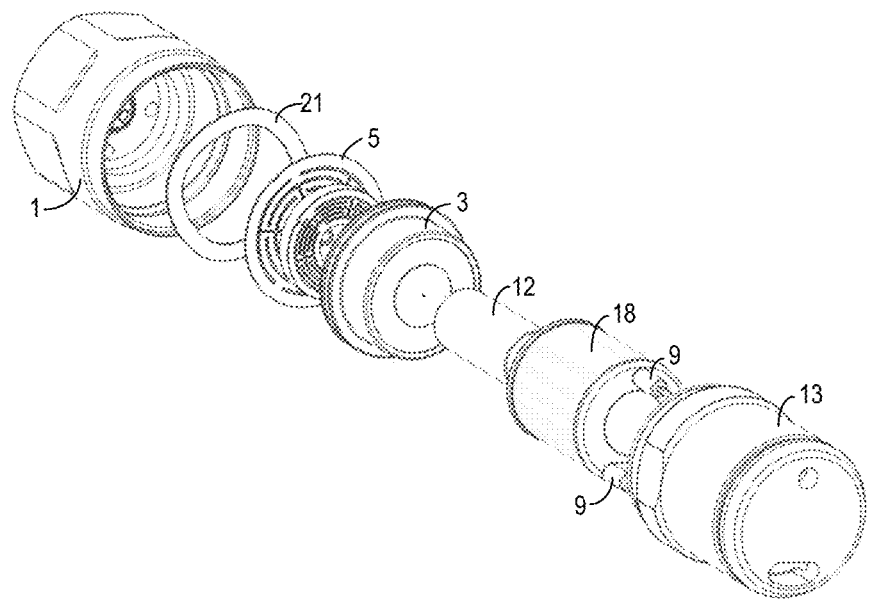
FIG. 5 is an exploded view of an apparatus according to some embodiments.
Figure 6:
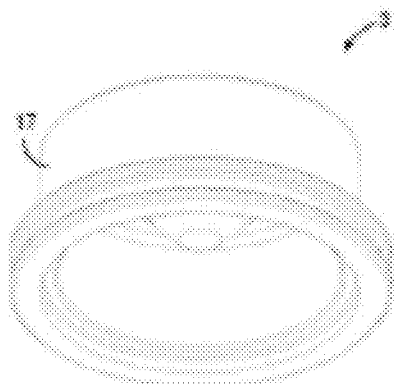
FIG. 6 is a bottom-side perspective view of a pole piece according to some embodiments.
Figure 7:
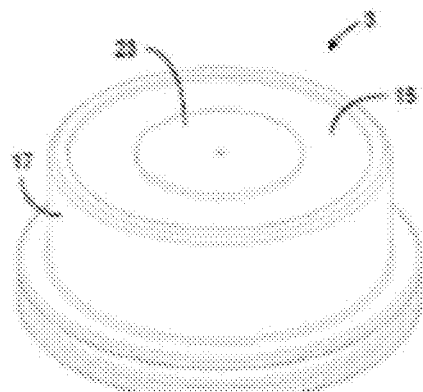
FIG. 7 is a top-side perspective view of a pole piece according to some embodiments.
Figure 8:
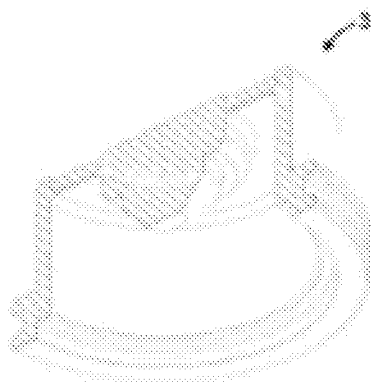
FIG. 8 is a bottom-side cross-sectional view of a pole piece according to some embodiments.
Figure 9:
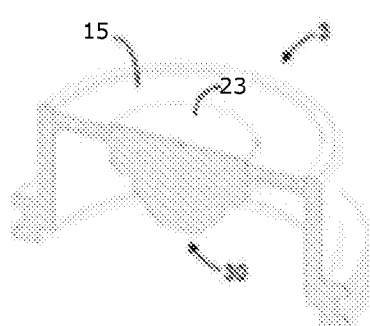
FIG. 9 is a top-side cross-sectional view of a pole piece according to some embodiments.
Figure 15:
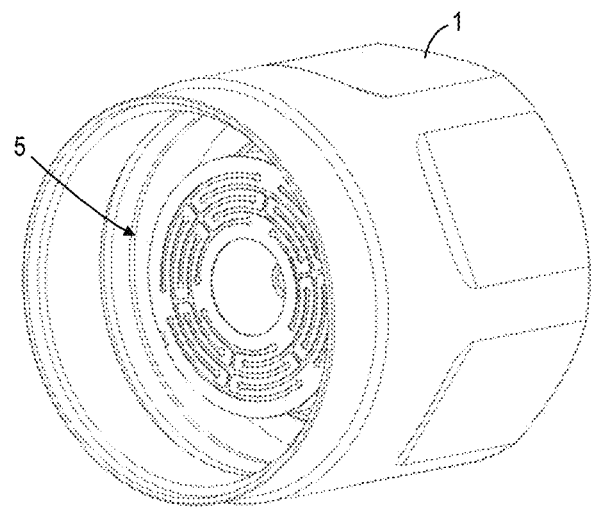
FIG. 15 is a top-side perspective view of a moving armature sub-assembly in a housing according to some embodiments.
Figure 16:
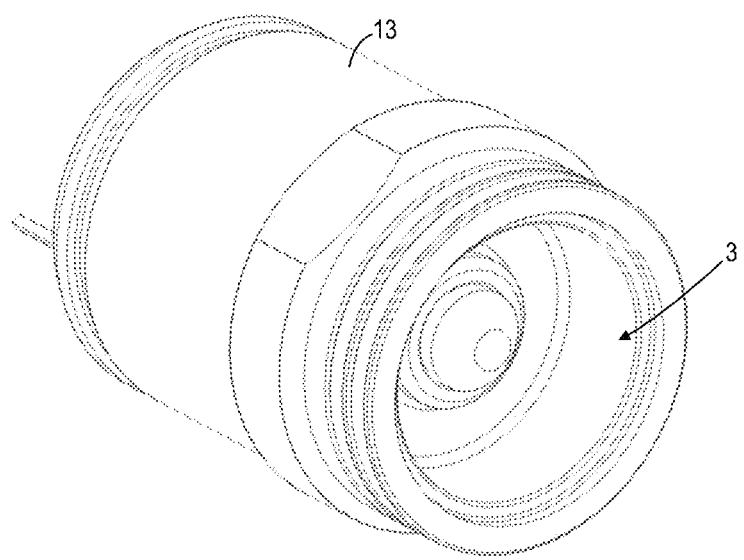
FIG. 16 is a bottom-side perspective view of a pole piece in a housing according to some embodiments.

FIG. 15 illustrates the armature sub-assembly (5) placed within the body (1), and FIG. 16 illustrates the pole piece (3) placed within the housing (13). As shown in FIGS. 1-3, the body (1) is threaded onto the housing (13).

As shown in FIGS. 1-4, the body (1) incorporates a tubular orifice (20). The body (1) may be made from a variety of materials including ferrous and non-ferrous metals, plastics and ceramics, depending on the requirements of the application. For malleable materials, one method of retaining the orifice (20) in the body (1) is to deform the body material around the circumference of the orifice (20). This both holds the orifice (20) in place, and creates a fluid tight seal between the body (1) and the orifice (20). For plastic and other body materials which are not easily deformed, the orifice (20) may be held in place by ultrasonic welding, heat staking, adhesive etc.

The external end of the orifice (20) protrudes from the bottom face of the body (1) and may be threaded. This may create an industry-standard mounting interface. The interior end of the orifice (20) has a small opening to limit the maximum flow therethrough. This design allows the maximum flow rating to be changed by using an orifice having a differently-sized internal opening, and/or by using a different combination of springs (7) and (4), which provides a different combined stiffness in the axial direction.

Each of springs (7) and (4) may exhibit any degree of axial stiffness. In certain implemenations, the guide spring (4) is small in diameter and it is therefore difficult for the guide spring (4) to provide significant stiffness in the axial direction without exceeding the stress limit of its constituent materials. Some embodiments may therefore utilize a guide spring (4) which is very flexible in the axial direction, and a valve spring (7) which is much stiffer than the guide spring (4). Embodiments may also or alternatively provide a common sub-assembly in which the guide spring (4) is attached permanently to the back of the armature (6), and the valve spring (7) is selected at the time of assembly, based on the required pressure and flow characteristics.

A wave washer (21) positioned between the body (1) and the valve spring (7) is used to press the valve spring (7) into contact with the pole piece (3) and to press the pole piece (3) against an end face of the center pole (12). O-Rings (19) seal the interior from the ambient atmosphere.

Figure 17:
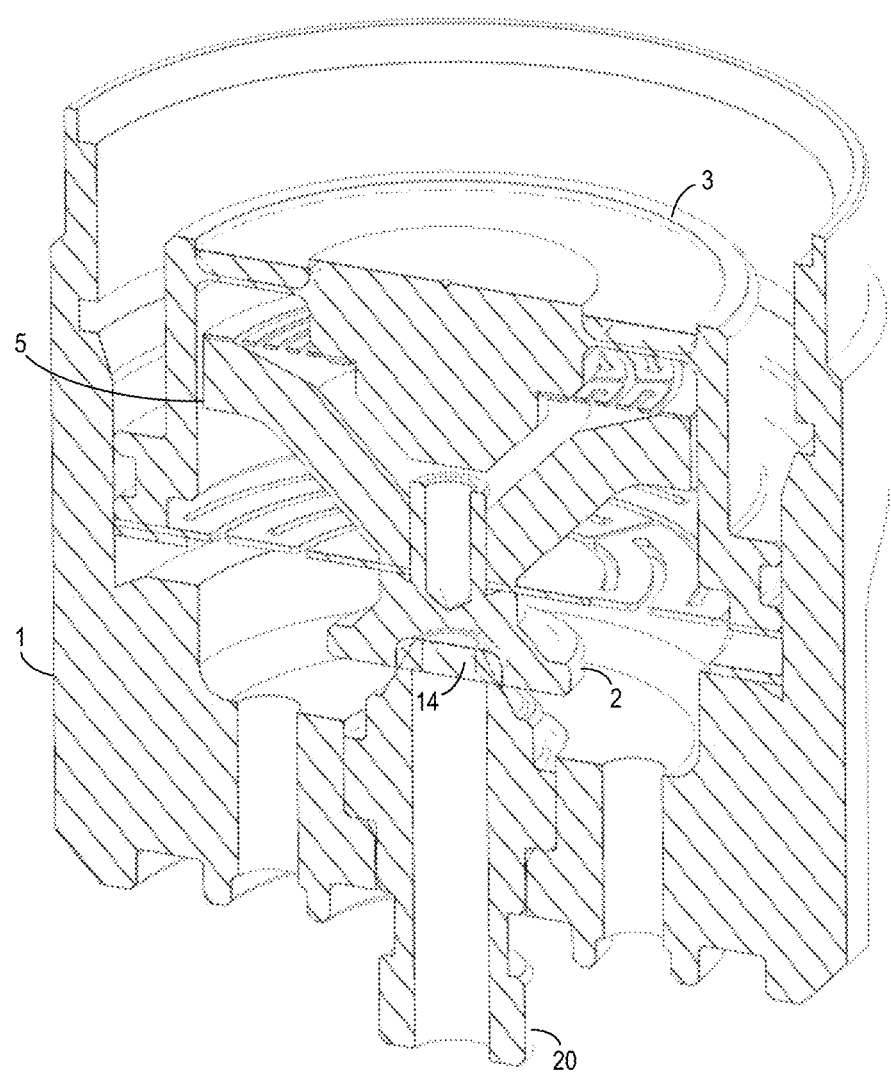
FIG. 17 is a top-side cross-sectional view of a pole piece and a moving armature sub-assembly in a housing according to some embodiments.

FIG. 17 is a cross-sectional view showing the body (1), orifice (20), the pole piece (3) and the armature sub-assembly (5), in order to even more clearly illustrate construction according to some embodiments. As illustrated, the elastomeric insert (14) of the poppet (2) closes the internal opening of the orifice (20), preventing fluid flow therethrough.

Figure 18:
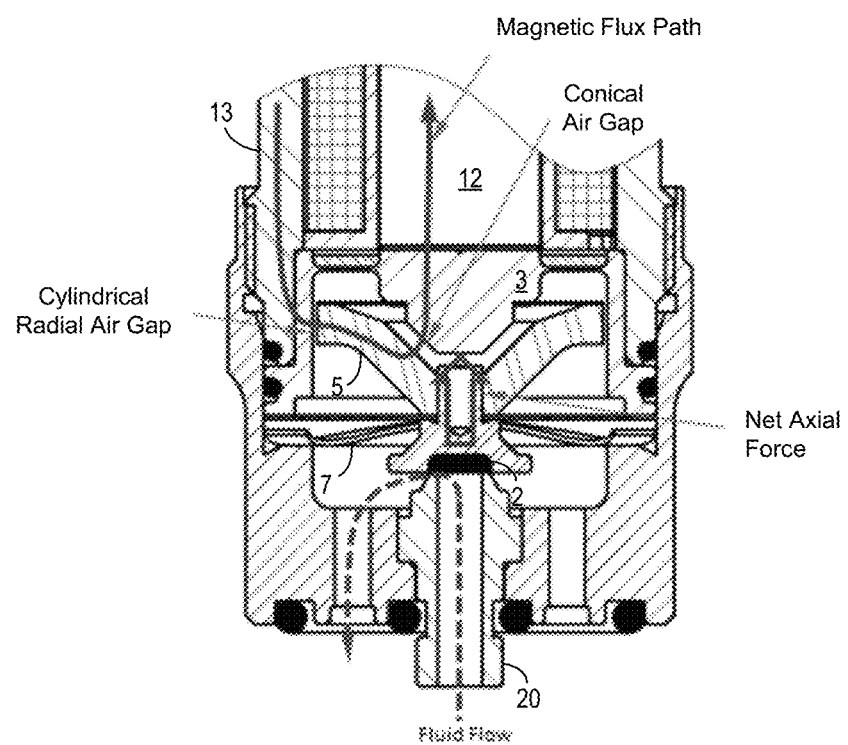
FIG. 18 is a cross-sectional view of an apparatus according to some embodiments.

FIG. 18 illustrates operation according to some embodiments. In a de-energized condition (i.e., no electrical current flowing through the coil (18)), pre-loaded forces in the valve spring (7) push the poppet (2) against the end of the orifice (20) creating a seal. Upon application of electrical current, current in the coil (18) generates magnetic flux along a path passing through the ferromagnetic housing (13), the pole piece (3), the armature (5) and the core (12), as shown. This magnetic flux traverses the illustrated cylindrical radial air gap between the internal cylindrical surface of the pole piece (3) and the corresponding external surface of the armature (5) and the illustrated conical air gap between the internal surface of the armature (5) and the center portion of the pole piece (3).

As a result, the magnetic flux generates a net axial force across the conical air gap as illustrated, attracting the armature (5) towards the pole piece (3), and tending to lift the poppet (2) off the orifice (20). If the magnetic flux, and resulting axial force, is strong enough, the poppet (3) lifts off the orifice (20) and allows the working fluid to flow in through the center of the orifice (20) and out of the exit ports in the body (1).

The magnetic flux will also create radial forces as it crosses the radial air gap between the internal cylindrical surface of the pole piece (3) and the external cylindrical surface of the armature (5). The radial forces will substantially cancel each other out if the armature (5) is kept concentric with respect to the pole piece (3) during operation. This concentricity is facilitated in some embodiments by the radial stiffness of the disk springs (4) and (7) and the tight tolerances of the internal features of the pole piece (3).

Reducing the amount of magnetic base material by means of a copper (or other non-magnetic material)-filled recess, as illustrated in FIG. 10 and FIG. 18, reduces a percentage of the generated of the magnetic flux which passes from the housing (13), through the base of the pole piece (3) and directly into the core (12), without passing through the armature (5). By reducing this percentage, the amount of axial force attracting the armature (5) towards the pole piece (3) is increased for a given amount of current applied to the coil (18).

The increased axial force for a given amount of applied current enables the use of a stiffer combination of guide spring (4) and valve spring (7). As will be described below with respect to FIG. 21, using a stiffer combination of guide spring (4) and valve spring (7) results in more linear operation with less hysteresis than a less-stiff combination of guide spring (4) and valve spring (7). Alternatively, the same guide spring may be used to provide a same linearity and hysteresis as less-efficient designs, but at a lower operating current.

The axial force will increase as the armature (5) gets closer to the pole piece (3). The mating surfaces of both parts are conical in order to minimize this effect and to therefore increase linearity of a relationship between current and axial force, both during opening (i.e., lifting the poppet (2) off of the orifice (20)) and closing (i.e., allowing the poppet (2) to move toward the orifice (20)).

Some embodiments therefore provide a controlled opening between the orifice (20) and the poppet (2), substantially proportional to the electrical current passing through the coil (18), thus allowing improved fluid flow control.

Figure 19:
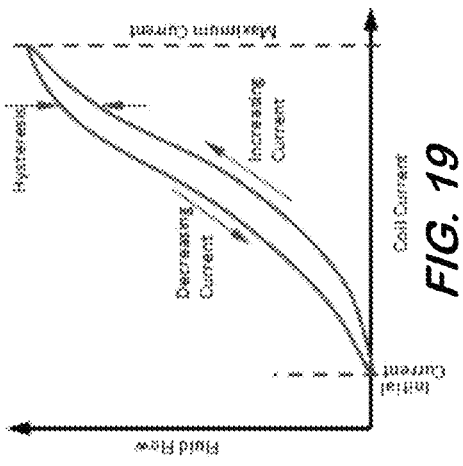

FIG. 19 shows relationships between valve fluid flow and coil current according to some embodiments. At low values of coil current, the magnetic force attracting the armature (5) to the pole piece (3) is less than the pre-load from the valve spring (7). In this case, the orifice remains closed and only leakage flow passes therethrough. At the depicted initial current value, the magnetic force is sufficient to begin to lift the poppet (2) off the orifice (20) and flow starts to increase. Increasing the coil current above the initial current value results in increasing fluid flow up to some maximum value dependent on the size of the orifice (20).

As shown in FIG. 19, the relationship between fluid flow and coil current is subject to nonlinearities due to inherent nonlinear magnetic characteristics of the device. This also causes hysteresis, resulting in different flow depending on whether the coil current is increasing or decreasing. By providing more axial force for a given applied current and maintaining a radial position of the armature as described above, some embodiments exhibit less hysteresis than conventional designs.

The flow characteristics can be selectively modified (e.g., for a given application) by changing the combined stiffness of, and the preload applied to, the valve spring (7) and the guide spring (4), and by changing the orifice opening.

Figure 20:
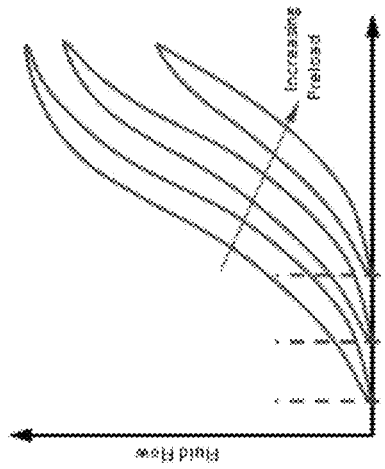
FIGS. 19 through 25 illustrate relationships between coil current and fluid flow for various physical and operational parameters according to some embodiments.
Figure 22:
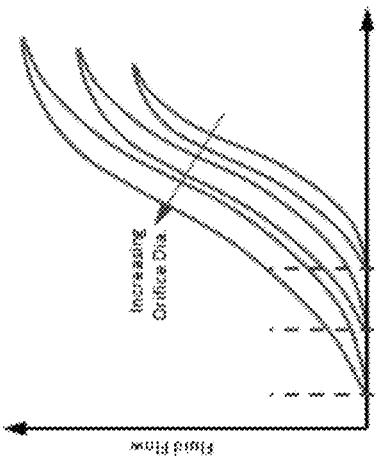
Figure 21:
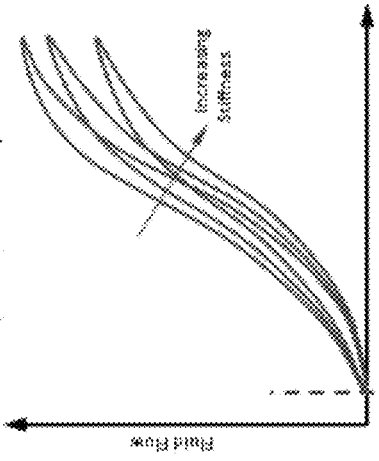

FIGS. 20-22 illustrate effects on the relationship between fluid flow and coil current caused by each of these changes. For example, FIG. 20 shows that increasing the preload applied to the valve spring (7) increases the initial current value required for poppet lift-off and reduces the flow output for a given coil current. FIG. 21 shows that increasing the combined stiffness of the disk springs (4) and (7) leaves the initial current value substantially unchanged, while reducing the slope of the current vs. flow characteristic curve. FIG. 22 shows that increasing the orifice diameter decreases the initial current value required for poppet lift-off and increases the slope of the current vs. flow characteristic curve.

Figure 23:
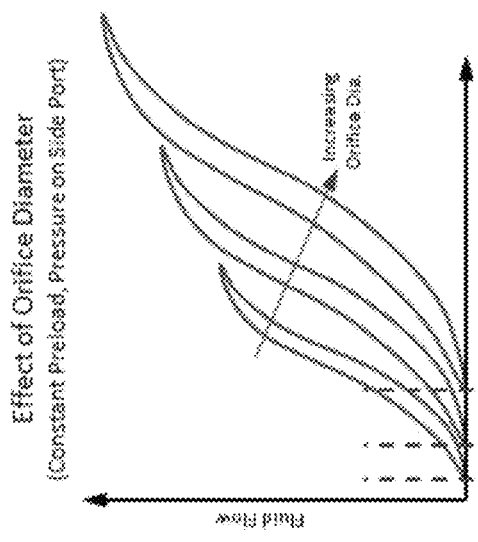

FIG. 23 also shows changes to the current vs. flow characteristic curve caused by changing the orifice diameter. However, FIG. 23 assumes that the orifice (20) is an outlet and that the incoming fluid arrives at a side port of the housing (1). As shown, increasing the orifice diameter in such a case has an effect which is opposite from the reverse case illustrated in FIG. 22. That is, increasing the orifice diameter increases the initial current value required for poppet lift-off and decreases the flow output for a given coil current.

Figure 24:
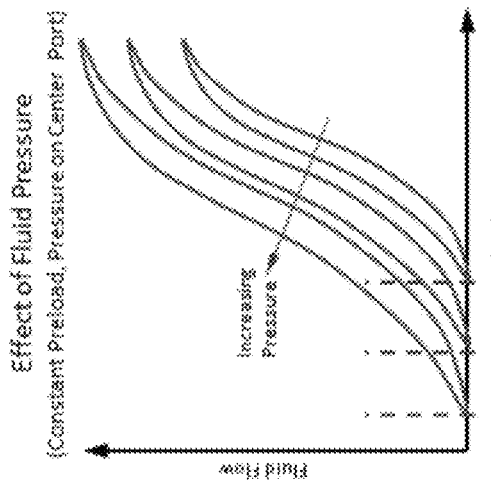
Figure 25:
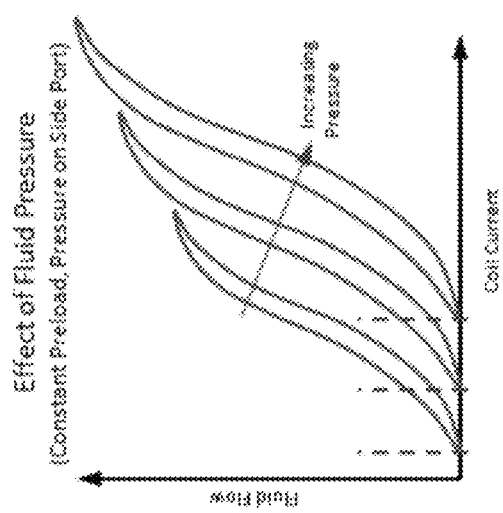

Preloading the disk springs (4) and (7) will now be discussed in more detail with respect to FIGS. 24 and 25. In a typical installation, fluid pressure at the inlet to the orifice (20) causes a net force which tends to lift the poppet (2) off the orifice (20). Thus, as the fluid pressure is increased, the value of current at which the poppet (2) begins to lift off the orifice (20) (i.e., the initial current) decreases. The amount of force which preloads the valve spring (7) in the opposite axial direction on the valve spring (7) may therefore be set such that the poppet (2) remains on the orifice (20) at a given maximum rated pressure.

Figure 27:
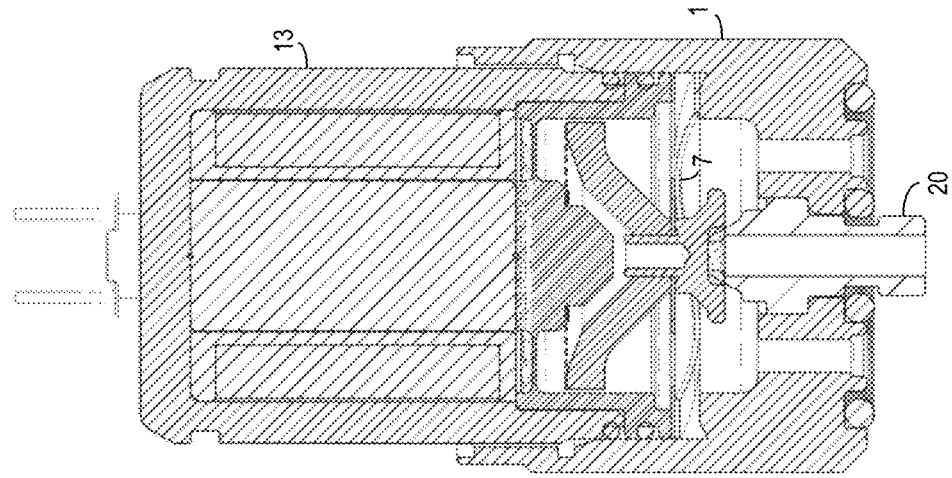
FIG. 27 is a cross-sectional view of an apparatus according to some embodiments.
Figure 26:
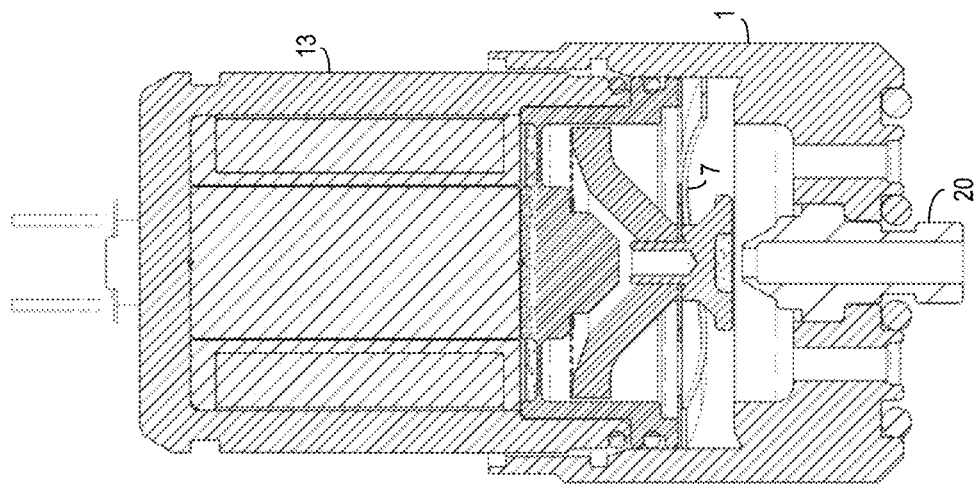
FIG. 26 is a cross-sectional view of an apparatus according to some embodiments.

Referring to FIGS. 26 and 27, the threaded connection between the housing (13) and the body (1) may be designed to allow some degree of adjustment. Threading the housing (13) further into the body (1) has the effect of increasing the preload on the disk springs (4) and (7) and vice versa. The preload may be adjusted in order to achieve a particular initial opening current for a particular inlet pressure. For example, during assembly, a current slightly above the initial opening current is applied to the coil (18) and the flow is monitored. The housing is then threaded in or out as appropriate to achieve a desired flow for a given current. Using this method, part-to-part variations can be minimized, and devices can be produced with more-consistent initial opening current or other characteristic(s). According to some embodiments, the interface between the orifice (20) and the body (1) may be threaded in order to adjust the preload by threading the orifice (20) in and out of the body (1).

Although the industry standard may assume that flow will enter through the center of the orifice (20), some embodiments may operate with fluid flow in the reverse direction. In this configuration, flow enters through the radially offset ports, and exits through the center of the orifice (20). Increasing the fluid pressure in this case causes the current required to lift the poppet (2) to increase.

The velocity of the fluid passing between the orifice (20) and the poppet (2) causes flow reaction forces which tend to force the poppet (2) towards the orifice (20). Some embodiments minimize these forces by designing the poppet (2) to have a much larger diameter than the orifice (20). This larger diameter forces the fluid to flow radially after exiting the orifice (20) and minimizes the (axial) flow forces.

Embodiments are not limited to the control of fluid flow. The principles herein may be used to provide a linear motor and/or solenoid usable for any purpose.

Embodiments described herein are solely for the purpose of illustration. Those in the art will recognize other embodiments may be practiced with modifications and alterations to that described above.

What is claimed is:

1. An apparatus comprising:
   a ferromagnetic housing defining a housing cavity, the cavity having an exterior surface with a first portion of a mechanically engageable structure on a portion of the exterior surface;
   an electrically-conductive coil disposed in the housing cavity and defining a coil cavity;
   a ferromagnetic core piece disposed in the coil cavity;
   a ferromagnetic pole piece comprising a first face in contact with the core piece and a projection extending from a second face of the pole piece opposite the first face;
   a flexible element defining an opening, where the projection is disposed within the opening and the flexible element is disposed between a portion of the projection and the first face of the pole piece;
   a ferromagnetic armature coupled to the flexible element, where the flexible element is disposed between at least a portion of the armature and the first face of the pole piece;
   the ferromagnetic armature including a guide spring attached to a back face of the ferromagnetic armature, and a second spring within the ferromagnetic armature;
   a body housing having a second portion of the mechanically engageable structure on an interior portion of the housing;
   the first portion of the mechanically engageable structure operatively coupled with the second portion of the mechanically engageable structure to create an adjustable preload tension on the guide spring and the second spring; and
   the adjustable preload tension selectively operable to modify an amount of coil current required to initiate motion in the armature.

2. An apparatus according to claim 1, wherein a first face of the flexible element is in contact with the projection, and wherein a second face of the flexible element opposite the first face of the flexible element is in contact with the armature.

3. An apparatus according to claim 2, wherein a portion of the second face of the flexible element which is in contact with the armature moves axially during axial movement of the armature, and a portion of the first face of the flexible element which is in contact with the projection is substantially stationary during axial movement of the armature.

4. An apparatus according to claim 3, wherein the portion of the second face of the flexible element which is in contact with the armature is an outer portion of the flexible element and the portion of the first face of the flexible element which is in contact with the projection an inner portion of the flexible element.

5. An apparatus according to claim 1, wherein the portion of the projection comprises a substantially conical surface.

6. An apparatus according to claim 5, wherein a surface of the armature facing the substantially conical surface is substantially conical.

7. An apparatus according to claim 1, wherein the pole piece comprises an internal surface defining a pole piece cavity, and wherein the flexible element and a portion of the armature are disposed within the pole piece cavity.

8. An apparatus according to claim 7, further comprising;
   a second flexible element coupled to the armature and to the pole piece, wherein the portion of the projection and at least the portion of the armature are disposed between the flexible element and the second flexible element.

9. An apparatus according to claim 8, wherein the flexible element and the second flexible element are substantially circular and exhibit higher radial stiffness than axial stiffness.

10. An apparatus according to claim 9, wherein the portion of the projection comprises a substantially conical surface, and
    wherein a surface of the armature facing the substantially conical surface is substantially conical.

11. An apparatus according to claim 1, wherein the flexible element is a disk spring and exhibits higher radial stiffness than axial stiffness.

12. An apparatus according to claim 1, wherein the core piece is composed of a first material and the pole piece is composed of a second material different from the first material.

13. The apparatus according to claim 1, the first portion of the mechanically engageable structure being a first set of screw threads, the second portion of the mechanically engageable structure being a second set of screw threads, and the first set of screw threads configured to operatively couple with the second set of screw threads.

14. An apparatus comprising:
    a ferromagnetic housing defining a housing cavity, the cavity having an exterior surface with a first portion of a mechanically engageable structure on a portion of the exterior surface;
    an electrically-conductive coil disposed in the housing cavity and defining a coil cavity;
    a ferromagnetic core piece disposed in the coil cavity;
    a ferromagnetic pole piece comprising a first face and an internal surface defining a pole piece cavity, the first face comprising a first ferromagnetic portion in contact with the core piece and a recess comprising substantially non-magnetic material;
    a ferromagnetic armature, where a portion of the armature is disposed within the pole piece cavity
    the ferromagnetic armature including a guide spring attached to a back face of the ferromagnetic armature, and a second spring within the ferromagnetic armature;
    a body housing having a second portion of the mechanically engageable structure on an interior portion of the housing;
    the first portion of the mechanically engageable structure operatively coupled with the second portion of the mechanically engageable structure to create an adjustable preload tension on the guide spring and the second spring; and
    the adjustable preload tension selectively operable to modify an amount of coil current required to initiate motion in the armature.

15. An apparatus according to claim 14, wherein a thickness of ferromagnetic material defining a lower portion of the recess is less than the thickness of the first ferromagnetic portion in contact with the core piece.

16. An apparatus according to claim 14, further comprising:
    a flexible element coupled to the ferromagnetic armature, where the flexible element is disposed between the portion of the armature and the first face of the pole piece.

17. An apparatus according to claim 16, further comprising:
a projection extending from a second face of the pole piece opposite the first face;
wherein the flexible element defines an opening, and
wherein the projection is disposed within the opening and the flexible element is disposed between a portion of the projection and the first face of the pole piece.

18. An apparatus according to claim 17, wherein a first face of the flexible element is in contact with the projection, and wherein a second face of the flexible element opposite the first face of the flexible element is in contact with the armature.

19. An apparatus according to claim 18, wherein a portion of the second face of the flexible element which is in contact with the armature moves axial during axial movement of the armature.

20. An apparatus according to claim 17, wherein the portion of the projection comprises a substantially conical surface.

21. An apparatus according to claim 20, wherein a surface of the armature facing the substantially conical surface is substantially conical.

22. An apparatus according to claim 17, further comprising;
a second flexible element coupled to the armature and to the pole piece, wherein the portion of the projection and at least the portion of the armature are disposed between the flexible element and the second flexible element.

23. An apparatus according to claim 14, wherein the core piece is composed of a first material and the pole piece is composed of a second material different from the first material.

24. The apparatus according to claim 14, the first portion of the mechanically engageable structure being a first set of screw threads, the second portion of the mechanically engageable structure being a second set of screw threads, and the first set of screw threads configured to operatively couple with the second set of screw threads.

* * * * *